Dec. 11, 1945.  C. K. CHATTEN  2,390,510
ADHESIVE TESTING DEVICE
Filed Feb. 19, 1945

INVENTOR.
Clarence K. Chatten
BY
Ralph L. Chappell
ATTORNEY

Patented Dec. 11, 1945

2,390,510

UNITED STATES PATENT OFFICE 2,390,510

ADHESIVE TESTING DEVICE

Clarence K. Chatten, Jackson Heights, N. Y.

Application February 19, 1945, Serial No. 578,761

5 Claims. (Cl. 73—150)

(Granted under the act of March 3, 1883, as amended April 30, 1928; 370 O. G. 757)

This invention relates to a device for testing the strength of adhesion between two layers of material, such as between plies of fabric bonded with rubber or other adhesive substance, or between rubber or similar adhesive substance and another material in articles made from an adhesive substance attached to the surface of other material. The invention relates particularly to such a device for use in testing material of a circular nature, such as a section of hose, and in which a layer of material is stripped from the specimen at a uniform specified rate during which the amount of applied tension is continuously indicated.

In a test as described, a circular specimen is prepared and slipped over a mandrel of hard wood or other suitable material, which is then mounted in a standard testing machine of a type for obtaining the strength or stretch of the material, and in which a positive tension may be continuously applied to the work being tested. Testing machines of this nature are provided with a power jaw which moves at a specified rate, and a registering head which indicates the amount of tension applied.

An object of the present invention is to provide a means for testing the adhesive strength between layers of material in ring specimens in which true values of applied tension will be directly indicated.

A further object is to provide an apparatus for mounting a mandrel in a testing machine so that the mandrel will be firmly supported but will be freely rotatable as tension is applied to the test specimen.

A further object is to provide an apparatus for mounting a mandrel upon the power jaw of a testing machine.

Another object is to provide an apparatus which is mounted upon a power jaw of a testing machine and which includes a mandrel that may be conveniently removed, or exchanged for one of different size.

Figure 1:
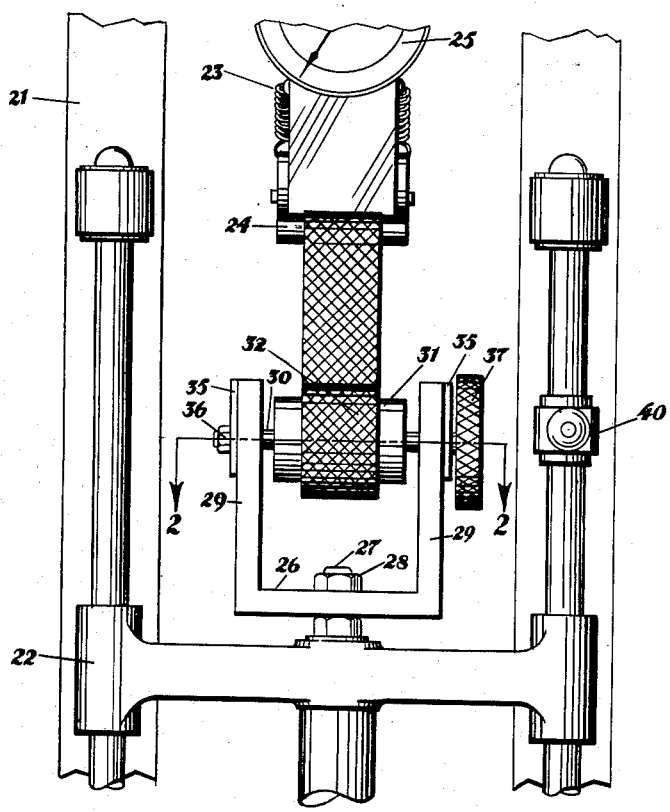
Figure 1 is a front view of the assembly in the testing machine.

Referring to the drawing in detail, Figure 1 shows a standard testing machine 21 having a power jaw 22, and a load indicating head 23, to which a clamp 24 is attached. A registering dial 25 mounted on the load indicating head directly indicates the tension applied to the test specimen.

Figure 2:
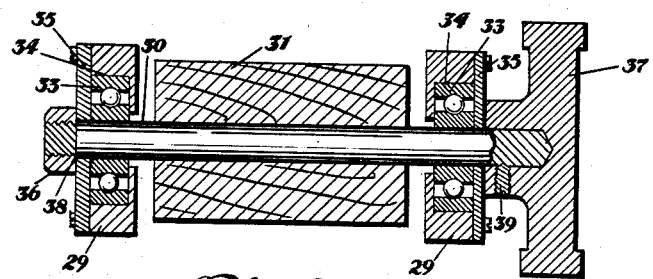
Figure 2 is a horizontal sectional view of the assembly of Figure 1 taken through the line 2—2 thereof.

The apparatus of the present invention consists of the jig 26 attached to the power jaw 22 by bolt 27 and nut 28. This jig consists of a frame having sides 29 which support a shaft 30 upon which a mandrel 31 is mounted. A test specimen 32 is shown in position on the mandrel 31, a layer of which is secured to the clamp 24 on the indicating head. The shaft is supported in the frame by ball bearings 33 held within recesses 34 in the side pieces 29 by side plates 35 (Figure 2). These bearings allow the shaft to rotate freely with a minimum amount of friction. The shaft is secured in the frame by nut 36 on one side and knurled knob 37 on the other. The threaded section upon which the nut 36 is screwed is slightly smaller than the main shaft so that an abutment 38 is formed. The nut can be drawn up only to this abutment thereby eliminating the possibility of the nut binding against side plate 35 if drawn too tight. The knurled knob 37 is secured to the shaft by set screw 39.

The mandrel 31 has an inside diameter approximately the same as the outside diameter of the shaft. Since ring specimens of different diameters are often tested, mandrels of different sizes are necessary. When changing from one mandrel to another or when placing a test specimen on the mandrel, it is only necessary to unscrew the nut 36 and pull the shaft out by pulling on the knob 37. The mandrel then on the shaft slips off and the test specimen may be put on or another mandrel may be put in its place. If in some testing machines there is not enough room between the jig and the frame of the machine to pull the shaft out sidewise, the nut 28 may be loosened and the jig swung around so that the knob 37 is to the front. The shaft may then be pulled out forward.

A stop 40 is optionally provided on the frame of the testing machine so as to eliminate the danger of raising the power jaw to such an extent as to ram the indicating head 23 with the jig 26.

By placing the device on the power jaw of the testing machine, there is no necessity for calibrating the registering device when different weight specimens and mandrels are used, and the value of the tension indicated represents the true value applied to the test specimen. The only other factor affecting the results of the test is that of friction in rotating the said shaft. Unless the shaft rotates freely the tension may not be at all times applied normal to the tangent of the ring circumference of the test specimen at the line of separation and the results of the test may be obscured. The provision of bearings 33 eliminates this possibility and the friction in rotating the shaft may be considered negligible.

In operation, the mandrel 31 is slipped off the shaft 30 and the test specimen placed thereon. The mandrel with the specimen in place is then placed on the shaft which is secured to the jig. A layer of material is separated from the test specimen to a sufficient extent to allow clamp 24 to be attached thereto. The testing machine is then started and tension applied so as to strip off the layer of material from the specimen on the mandrel. The shaft 30 rotates freely so that the applied force will be normal at all times to the tangent of the ring circumference of the specimen at the line of separation. The registering device 25 continuously indicates the true value of the tension applied.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A device for testing the strength of adhesion between adhesively bonded layers of a test specimen comprising a stationary load registering head to which a free end portion of one of said layers of said test specimen is to be anchored, a movable head longitudinally away from said stationary head, means for moving said movable head, and a freely rotatable member detachably mounted upon the said movable head for receiving another layer of said test specimen.

2. A detachable holding device for use with a testing machine of the type having a longitudinally movable power head and a stationary load registering head to which an end portion of a rolled specimen is to be anchored, which device comprises a freely rotatable member detachably mounted upon the movable power head of said testing machine for receiving a roll of the test specimen.

3. A detachable holding device for use with a testing machine of the type having a longitudinally movable power head and a stationary load registering head to which an end portion of a rolled specimen is to be anchored, and by means of such movement the specimen is to be stripped from its roll, comprising a frame detachably mounted upon the movable power head of the said testing machine, a shaft mounted upon said frame and freely rotatable thereon, and a mandrel mounted upon said shaft for receiving a roll of the test specimen.

4. A detachable holding device for use with a testing machine of the type having a longitudinally movable power head and a stationary load registering head to which an end portion of a rolled specimen is to be anchored, and by means of such movement the specimen is to be stripped from its roll, comprising a frame detachably mounted upon the movable power head of the said testing machine and having side pieces containing anti-friction bearings, a shaft rotatably mounted upon said side pieces and extending through and supported by the said bearings, and a mandrel mounted upon the said shaft between the said side pieces for receiving a roll of the test specimen.

5. A detachable holding device for use with a testing machine of the type having a longitudinally movable power head and a stationary load registering head to which an end portion of a rolled specimen is to be anchored, and by means of such movement the specimen is to be stripped from its roll, comprising a frame detachably mounted upon the movable power head of the said testing machine and having side pieces containing anti-friction bearings, a shaft rotatably mounted upon said side pieces and extending through and supported by said bearings, and a mandrel slidably mounted upon the said shaft between the said side pieces for receiving a roll of the test specimen, said shaft having means detachably secured to the ends extending through the said bearing boxes for holding the said shaft within the said frame.

CLARENCE K. CHATTEN.